(12) United States Patent
Chen et al.

(10) Patent No.: US 11,566,901 B2
(45) Date of Patent: Jan. 31, 2023

(54) INTEGRATED NAVIGATION METHOD FOR MOBILE VEHICLE

(71) Applicant: ZHEJIANG YAT ELECTRICAL APPLIANCE CO., LTD, Zhejiang (CN)

(72) Inventors: Yong Chen, Zhejiang (CN); Jianfei Gong, Zhejiang (CN); Fengwu Chen, Zhejiang (CN); Zhe Zhang, Zhejiang (CN)

(73) Assignee: ZHEJIANG YAT ELECTRICAL APPLIANCE CO., LTD, Zhejiang (CN)

( * ) Notice: Subject to any disclaimer, the term of this patent is extended or adjusted under 35 U.S.C. 154(b) by 233 days.

(21) Appl. No.: 16/965,608

(22) PCT Filed: May 30, 2019

(86) PCT No.: PCT/CN2019/089204
§ 371 (c)(1),
(2) Date: Jul. 29, 2020

(87) PCT Pub. No.: WO2019/228437
PCT Pub. Date: Dec. 5, 2019

(65) Prior Publication Data
US 2021/0041239 A1    Feb. 11, 2021

(30) Foreign Application Priority Data

Jun. 1, 2018    (CN) .......................... 201810556653.6

(51) Int. Cl.
*G01C 21/16* (2006.01)
*A01B 69/00* (2006.01)
(Continued)

(52) U.S. Cl.
CPC ............ *G01C 21/165* (2013.01); *A01B 69/00* (2013.01); *A01D 34/008* (2013.01); *G01C 21/20* (2013.01);
(Continued)

(58) Field of Classification Search
CPC ........................... G01C 21/165; G05D 1/0278
See application file for complete search history.

(56) References Cited

U.S. PATENT DOCUMENTS

| | | | |
|---|---|---|---|
| 6,424,914 B1 | 7/2002 | Lin | |
| 8,086,405 B2 * | 12/2011 | Han | ........................ G01C 21/28 701/472 |
| 2009/0254279 A1 | 10/2009 | Han et al. | |

FOREIGN PATENT DOCUMENTS

| | | |
|---|---|---|
| CN | 1361409 A | 7/2002 |
| CN | 101788296 A | 7/2010 |

(Continued)

OTHER PUBLICATIONS

Translation of CN 106950586 (Year: 2017).*
(Continued)

*Primary Examiner* — Jeff A Burke
*Assistant Examiner* — Christopher A Buksa
(74) *Attorney, Agent, or Firm* — Yue (Robert) Xu; Apex Attorneys at Law, LLP (57) ABSTRACT

An integrated navigation method for a mobile vehicle is provided, which includes: acquiring a motion measurement of the mobile vehicle by using an inertial navigation element in the mobile vehicle and calculating a gesture parameter of the mobile vehicle based on the motion parameter; estimating, based on the gesture parameter, a motion state of the mobile vehicle in a real time manner by using a satellite navigation element in the mobile vehicle to obtain an error estimation value of the motion state, and correcting a motion
(Continued)

parameter of the mobile vehicle based on the error estimation value of the motion state; and controlling an operation route of the mobile vehicle based on corrected navigation information.

9 Claims, 3 Drawing Sheets

(51) Int. Cl.
    *A01D 34/00*     (2006.01)
    *G01C 21/20*     (2006.01)
    *G01S 19/47*     (2010.01)
    *A01D 101/00*     (2006.01)
    *G05D 1/02*     (2020.01)

(52) U.S. Cl.
    CPC .......... *G01S 19/47* (2013.01); *A01D 2101/00* (2013.01); *G05D 1/027* (2013.01); *G05D 1/0278* (2013.01); *G05D 2201/0208* (2013.01)

(56) References Cited

FOREIGN PATENT DOCUMENTS

| CN | 101949703 | A | | 1/2011 |
|---|---|---|---|---|
| CN | 102519463 | A | | 6/2012 |
| CN | 106950586 | A | * | 7/2017 |
| CN | 106950586 | A | | 7/2017 |
| CN | 109059904 | A | | 12/2018 |

OTHER PUBLICATIONS

International Search Report for PCT/CN2019/089204 dated Aug. 28, 2019, ISA/CN.

The Chinese 1st Office Action dated Mar. 3, 2021 for CN201810556653.6.

* cited by examiner

INTEGRATED NAVIGATION METHOD FOR MOBILE VEHICLE

The present application is a national phase application of PCT international patent application No. PCT/CN2019/089204, filed on May 30, 2019, which claims priority to Chinese Patent Application No. 201810556653.6, titled "INTEGRATED NAVIGATION METHOD FOR MOBILE VEHICLE", filed on Jun. 1, 2018 with the China National Intellectual Property Administration, both of which are incorporated herein by reference in their entireties.

FIELD

The present disclosure relates to the field of navigation, and particularly to an integrated navigation method for a mobile vehicle.

BACKGROUND

With the rapid development of economy and constant improvement of living standard, people's requirements on afforestation in environment become higher and higher, such that more staffs are required to maintain lots of lawns. With the use of intelligent household mobile vehicles, both hands are allowed for freedom to improve work efficiency and maintenance costs of household lawns are reduced effectively. Moreover, problems of a conventional mobile vehicle such as exhaust emission and high noise levels are reduced, such that grass can be mowed in an intelligent and environmentally friendly manner and the mobile vehicle can be controlled in a simple way, thereby reducing workforces and reducing costs.

GPS is mainly used in a mobile vehicle to function as a navigation system. Though GPS is a mature technology with components of low cost, GPS cannot meet the demand of high accuracy positioning in a case that the mobile vehicle operates in a small region. Therefore, a GPS-based route planning with high accuracy cannot be achieved.

SUMMARY

In order to solve the deficiencies and drawbacks in conventional technologies, an integrated navigation method for a mobile vehicle is provided according to the present disclosure, to increases a positioning accuracy.

To achieve the objective above, an integrated navigation method for a mobile vehicle is provided according to the disclosure. The integrated navigation method includes:

acquiring a motion measurement of the mobile vehicle by using an inertial navigation element in the mobile vehicle and calculating a gesture parameter of the mobile vehicle based on the motion measurement;

estimating, based on the gesture parameter, a motion state of the mobile vehicle in a real time manner by using a satellite navigation element in the mobile vehicle to obtain an error estimation value of the motion state, and correcting a motion parameter of the mobile vehicle based on the error estimation value of the motion state; and controlling an operation route of the mobile vehicle based on corrected navigation information.

Optionally, the acquiring a motion measurement of the mobile vehicle by using an inertial navigation element in the mobile vehicle and calculating a gesture parameter of the mobile vehicle based on the motion measurement includes:

calculating velocity information of the mobile vehicle by using the inertial navigation element;

calculating position information of the mobile vehicle by using the inertial navigation element; and calculating the gesture parameter of the mobile vehicle based on the velocity information and the position information.

Optionally, the calculating velocity information of the mobile vehicle by using the inertial navigation element includes:

acquiring angular velocity information of the mobile vehicle by using a gyroscope in the inertial navigation element;

acquiring linear velocity information of the mobile vehicle by using an accelerometer; and calculating a velocity of the mobile vehicle according to equation 1, $$v_k^n = v_{k-1}^n + \Delta v_{f,k}^n + \Delta v_{g/cor,k}^n$$
$$= v_{k-1}^n + [I - 0.5(\xi_k X)]C_{b(k-1)}^{n(k-1)}(\Delta v_{f,k}^b + \Delta v_{scul} + \Delta v_{cot}) + \Delta v_{g/cor,k}^n \qquad \text{equation 1}$$

where $v_k^n$ represents the velocity of the mobile vehicle in a navigation coordinate system at a time instant k, I represents an identity matrix, $\xi_k$ represents an amount of change in angle of the navigation coordinate system with respect to an inertial frame of reference from a time instant k−1 to the time instant k, X represents a cross product operation, $C_{b(k-1)}^{n(k-1)}$ represents a gesture rotation matrix at the time instant k−1, $\Delta v_{f,k}^b$ represents an increment of the velocity of the mobile vehicle in a mobile vehicle coordinate system from the time instant k−1 to the time instant k, $\Delta v_{scul}$ represents a sculling effect velocity compensation, $\Delta v_{cot}$ represents a rotating effect velocity compensation, and $\Delta v_{g/cor,k}^n$ represents a velocity increment caused by gravity and Coriolis force.

Optionally, the calculating velocity information of the mobile vehicle by using the inertial navigation element includes:

calculating, according to equation 2, a position of the mobile vehicle by using the inertial navigation element, $$q_{n(k)}^{e(k)} = q_{e(k-1)}^{e(k)} \times q_{n(k-1)}^{e(k-1)} \times q_{n(k)}^{n(k-1)}, \text{ where} \qquad \text{equation 2}$$

$$q_{n(k)}^{n(k-1)} = \begin{bmatrix} \cos\|0.5\zeta_k\| \\ \dfrac{\sin\|0.5\zeta_k\|}{\|0.5\zeta_k\|} * 0.5\zeta_k \end{bmatrix},$$

$$q_{e(k-1)}^{e(k)} = \begin{matrix} \cos\|0.5\xi_k\| \\ -\dfrac{\sin\|0.5\xi_k\|}{\|0.5\xi_k\|} * 0.5\xi_k \end{matrix},$$

$\zeta_k$ represents an equivalent rotation vector in a navigation coordinate system from a time instant k−1 to a time instant k, $\xi_k$ represents an equivalent rotation vector caused by earth rotation from the time instant k−1 to the time instant k, $q_{n(k)}^{e(k)}$ represents a position quaternion at the time instant k; and transforming updated quaternion to obtain updated position, where a relationship between the quaternion and the position is $$q_n^e = \begin{bmatrix} \cos\left(-\frac{\pi}{4}-\frac{L}{2}\right)*\cos\left(\frac{\lambda}{2}\right) \\ -\sin\left(-\frac{\pi}{4}-\frac{L}{2}\right)*\sin\left(\frac{\lambda}{2}\right) \\ \sin\left(-\frac{\pi}{4}-\frac{L}{2}\right)*\cos\left(\frac{\lambda}{2}\right) \\ \cos\left(-\frac{\pi}{4}-\frac{L}{2}\right)*\sin\left(\frac{\lambda}{2}\right) \end{bmatrix}$$

where L represents a latitude of a current position, and $\lambda$ represents a longitude of the current position.

Optionally, the calculating the gesture parameter of the mobile vehicle based on the velocity information and the position information includes:

constructing a quaternion for calculating the gesture parameter according to equation 3, $$q_{b(k)}^{n(k)} = q_{n(k-1)}^{n(k)} \times q_{b(k-1)}^{n(k-1)} \times q_{b(k)}^{b(k-1)} \text{ where} \qquad \text{equation 3}$$

$$q_{n(k-1)}^{n(k)} = \begin{bmatrix} \cos\|0.5\zeta_k\| \\ -\dfrac{\sin\|0.5\zeta_k\|}{\|0.5\zeta_k\|}*0.5\zeta_k \end{bmatrix},$$

$$q_{b(k)}^{b(k-1)} = \begin{matrix} \cos\|0.5\phi_k\| \\ \dfrac{\sin\|0.5\phi_k\|}{\|0.5\phi_k\|}*0.5\phi_k \end{matrix},$$

$\zeta_k$ represents an equivalent rotation vector in a navigation coordinate system from a time instant k−1 to a time instant k, $\phi_{(k)}$ represents an equivalent rotation vector in a mobile vehicle coordinate system, and $q_{b(k)}^{n(k)}$ represents a gesture quaternion at the time instant k; and transforming updated gesture quaternion to obtain a gesture matrix $C_b^n$ according to equation 4, $$C_b^n = \qquad\qquad\qquad\qquad\qquad\qquad\qquad\qquad \text{equation 4}$$

$$\begin{bmatrix} q_1^2+q_2^2+q_3^2+q_4^2 & 2(q_2q_3-q_1q_4) & 2(q_2q_4+q_1q_3) \\ 2(q_2q_3+q_1q_4) & q_1^2-q_2^2+q_3^2-q_4^2 & 2(q_3q_4-q_1q_2) \\ 2(q_2q_4-q_1q_3) & 2(q_3q_4-q_1q_2) & q_1^2-q_2^2-q_3^2+q_4^2 \end{bmatrix}$$

where $C_b^n$ represents the gesture matrix in a direction cosine form and $q_x$ represents an x-th dimension of the gesture quaternion $q_b^n$; and obtaining a misalignment angle according to a relationship between the gesture matrix and a direction angle, $$C_b^n = \begin{bmatrix} \cos(p)\cos(h) & -\cos(r)\sin(h)+\sin(r)\sin(p)\cos(h) & \sin(r)\sin(h)+\cos(r)\sin(p)\cos(h) \\ \cos(p)\sin(h) & \cos(r)\cos(h)+\sin(r)\sin(p)\sin(h) & -\sin(r)\cos(h)+\cos(r)\sin(p)\sin(h) \\ -\sin(p) & \sin(r)\cos(p) & \cos(r)\cos(p) \end{bmatrix}$$

$r = a\tan 2(C_b^n(3,2), C_b^n(3,3))$ $p = a\tan\left(-C_b^n(3,1)/\sqrt{(C_b^n(3,2)^2+C_b^n(3,3)^2)}\right)$ $h = a\tan 2(C_b^n(2,1), C_b^n(1,1))$ where r represents a flip angle, p represents a pitch angle, h represents a heading angle, and $C_b^n(x, y)$ represents an (x/y)-th dimension of the gesture matrix $C_b^n$, where an initial gesture matrix is initialized according to the above misalignment angle transformation matrix.

Optionally, the estimating, based on the gesture parameter, a motion state of the mobile vehicle in a real time manner by using a satellite navigation element in the mobile vehicle to obtain an error estimation value of the motion state, and correcting a motion parameter of the mobile vehicle based on the error estimation value of the motion state includes:

selecting a position error, a velocity error, a misalignment angle of the mobile vehicle, a bias error of a gyroscope and a bias error of an accelerator as state variables in a filtering estimation process and predicting a state covariance matrix from a time instant n−1 to a time instant n; and estimating the state variable and the state covariance matrix in a real time manner by using a Kalman filtering method, and performing, in the process of real time estimation, feedback correction on the motion parameter of the mobile vehicle based on the error estimation value of the motion state.

Optionally, the predicting a state covariance matrix from a time instant n−1 to a time instant n includes:

constructing a state variable expression $\hat{X}_{n|n-1}=\phi_{n|n-1}\hat{X}_{n-1}$ and constructing a state variable expression $P_{n|n-1}=\phi_{n|n-1}P_{n-1}\phi_{n|n-1}^T+(\phi_{n|n-1}Q+Q\phi_{n|n-1}^T)\delta t/2$, where $\hat{X}_{n-1}$ represents an estimation value of a state variable X at the time instant n−1, $P_{n-1}$ represents a state covariance matrix at the time instant n−1, $\phi_{n|n-1}$ represents a state transition matrix from the time instant −1 to the time instant n, Q represents a system noise matrix, and $\delta t$ represents an updating period of an inertial measurement unit.

Optionally, the estimating the state variable and the state covariance matrix in a real time manner by using a Kalman filtering method, and performing, in the process of real time estimation, feedback correction on the motion parameter of the mobile vehicle based on the error estimation value of the motion state includes:

performing real-time estimation by using the Kalman filtering method, where a filter gain expression is shown as equation 5, $$K_n = P_{n|n-1}H_n^T(H_nP_{n|n-1}H_n^TR_n)^{-1} \qquad \text{equation 5}$$

where $K_n$ represents a filter gain at the time instant n, $H_n$ represents an observation matrix at the time instant n which is obtained from a relationship between an observation variable and the state variable, $R_n$ represents an observation noise covariance matrix at the time instant n;

performing real-time estimation according to equation 6 and equation 7, $$\hat{X}_n = \hat{X}_{n|n-1} + K_n(Z_n - H_n\hat{X}_{n|n-1}) \qquad \text{equation 6}$$

where $\hat{X}_n$ represents an estimation value of the state variable at the time instant n, $Z_n$ represents the observation variable at the time instant n, which is a difference in position and velocity between an inertial measurement unit and GNSS, $$P_n = (I - K_n H_n) P_{n|n-1} (I - K_n H_n)^T + K_n R_n K_n^T \qquad \text{equation 7}$$

where $P_n$ represents the state covariance matrix at the time instant n, I represents an identity matrix;

after performing estimation by filtering, correcting a current position, a current velocity and a current gesture by using the estimated state variable and performing feedback correction on the estimated bias of the gyroscope and the estimated bias of the accelerator for the outputting information in the next period.

Optionally, the integrated navigation method for a mobile vehicle further includes: performing a time synchronization operation on data obtained by the inertial navigation element and data obtained by the satellite navigation element.

The beneficial effects of the technical solution provided by the present disclosure are as follows. Real-time position determination, velocity determination and gesture determination with high sensitivity and high accuracy are achieved by integrated filtering estimation of GNSS/INS and a vehicle kinematics model. The GNSS/INS/vehicle integrated navigation method combined with a vehicle kinematics model realizes reciprocity of GNSS and INS and provides position information, velocity information and gesture information with high sensitivity and high accuracy, such that continuous and steady operation of a mobile vehicle in a complex environment is achieved.

BRIEF DESCRIPTION OF THE DRAWINGS

In order to more clearly describe the technical solutions in the present disclosure, drawings to be used in the description of the embodiments of the present disclosure are briefly described hereinafter. It is apparent that the drawings described below show merely some embodiments of the present disclosure, and those skilled in the art may obtain other drawings according to the provided drawings without any creative effort.

DETAILED DESCRIPTION OF THE EMBODIMENTS

In order to make structures and advantages of the present disclosure more clear, structures of the present disclosure are further described below in conjunction with the drawings of the present disclosure.

Embodiment 1

Figure 1:
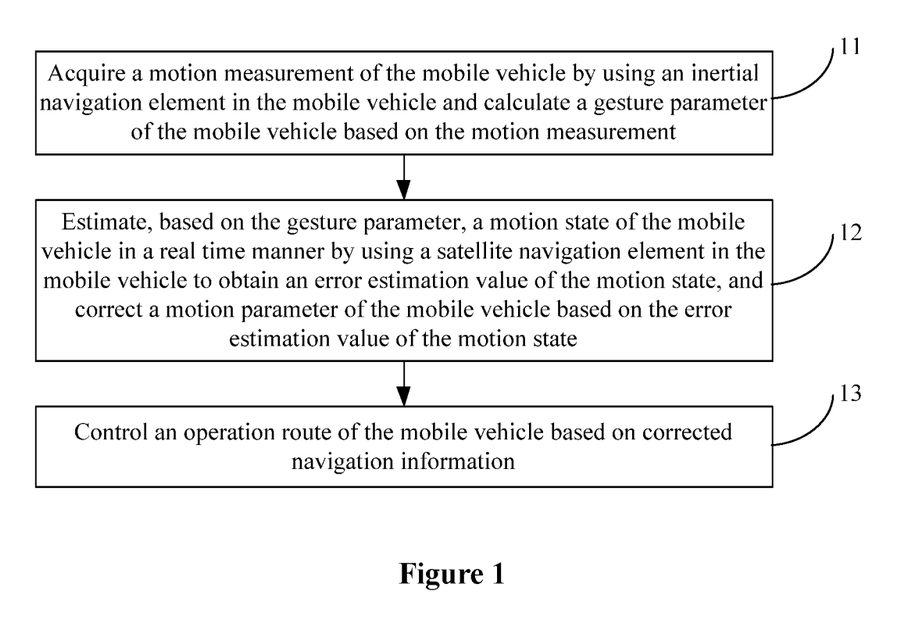
FIG. 1 is a schematic flowchart of an integrated navigation method for a mobile vehicle according to the present disclosure.

An integrated navigation method for a mobile vehicle is provided according to the present disclosure. As shown in FIG. 1, the integrated navigation method includes step 11 to step 13.

In step 11, a motion measurement of the mobile vehicle is acquired by using an inertial navigation element in the mobile vehicle and a gesture parameter of the mobile vehicle is calculated based on the motion measurement.

In step 12, a motion state of the mobile vehicle is estimated in a real time manner, based on the gesture parameter, by using a satellite navigation element in the mobile vehicle to obtain an error estimation value of the motion state, and a motion parameter of the mobile vehicle is corrected based on the error estimation value of the motion state.

In step 13, an operation route of the mobile vehicle is controlled based on corrected navigation information.

In practice, the integrated navigation method according to the present disclosure is used in various aspects of a mobile vehicle such as navigation and route planning. Global Positioning System (GPS) is often used in conventional navigation method for the mobile vehicle, where the mobile vehicle has a low positioning accuracy in a case that the mobile vehicle operates in a small region. Therefore, an integrated navigation method using Global Navigation Satellite System (GNSS) and Inertial Navigation System (INS) is provided according to the present disclosure.

In order to solve the above problems, the present disclosure employs following solutions.

In a case that new position information, velocity information and gesture information are calculated based on output of an inertial device and position information and velocity information are updated by GNSS, a difference in position and velocity between inertial navigation system and GNSS are taken as observation variables. Position, velocity and gesture of a vehicle and error of the inertial device in INS are taken as state variables. A Kalman filtering estimation is performed based on the observation variables and the state variables to obtain an error correction value of 15 dimension state variables.

If the vehicle is in a moving state, feedback correction is performed on position, velocity and gesture of the vehicle and a bias of a gyroscope and a bias of an accelerator based on the error estimation value of the motion state.

If the vehicle is in a stationary state, which means that a current velocity is zero, a difference between the calculated velocity and zero is taken as an observation variable. A Kalman filtering estimation is performed based on the observation variable to obtain a state correction quantity, and feedback correction is performed on the vehicle error and the IMU error.

In a case that new position information, velocity information and gesture information are calculated by using the inertial navigation system and motor rotation speed information of a vehicle is updated by the propelling motor driver of a mower, a difference in velocity between the inertial navigation system and the vehicle is taken as an observation variable. Kalman filtering estimation is performed based on the observation variable to obtain a state error correction quantity used in performing feedback correction on the vehicle error and the IMU error.

The updating rate of the IMU is relatively faster. In a case that the inertial navigation system calculates and updates new position information, velocity information and gesture information and GNSS and the vehicle model does not update information, information updated by the inertial navigation system is position information, velocity information and gesture information of the vehicle.

According to the disclosure, a gesture of a vehicle is calculated by using an inertial navigation device. The gesture of the vehicle with high accuracy and high sensitivity and a real-time misalignment angle of the vehicle are provided by the inertial navigation device in a short time to provide accurate gesture information for an automatic operation of a mower.

(b) According to the disclosure, real-time position information with high accuracy updated by GNSS and information calculated by the inertial navigation device are integrated, to avoid respective defects of GNSS and the inertial navigation system. Position information, velocity information and vehicle gesture information with high accuracy and high sensitivity are provided in a real time manner, to provide accurate navigation information for an automatic operation of a mower.

(c) According to the present disclosure, a zero velocity update technology and a heading locking technology are adopted in a case that the vehicle is in a stationary state. In a case that the vehicle is in a stationary state, heading of IMU cannot be observed, and current position information, gesture information particularly heading information of IMU can be maintained well by adopting the zero velocity update technology and the heading locking technology.

(d) According to the present disclosure, INS/vehicle integrated filtering estimation is adopted to constrain, i.e. NHC (nonholonomic), three-dimensional velocity of the vehicle. Based on navigation information calculated by using the inertial device and real-time rotation speed information of a propelling motor, heading can be aided well by adopting NHC. If GNSS information is lost, NHC can restrain the divergence of INS, therefore, position information, velocity information and gesture information with high accuracy are provided in a short time to efficiently solve the problem of low accuracy in a case that the vehicle is in a complex environment such as a signal is occluded for a short time.

Real-time position determination, velocity determination and gesture determination with high sensitivity and high accuracy are achieved by integrated filtering estimation of GNSS/INS and a vehicle kinematics model. GNSS can achieve position determination with high accuracy, but real-time property of data is low. Besides, the data is affected by signal strength easily. In a complex environment such as a weak signal environment, position determination accuracy is decreased rapidly, such that demand of continuous and steady operation in a complex environment of a mobile vehicle can not satisfied. INS can achieve position determination with high accuracy and real time behavior in a short time, but bring an error increased with the elapse of time. Kinematic model of the mobile vehicle may be simplified as a vehicle model with two wheels, and partial freedom of the mobile vehicle can be constrained by using the motion characteristics of the vehicle. The GNSS/INS/vehicle integrated navigation method combined with a vehicle kinematics model realizes reciprocity of GNSS and INS and provides position information, velocity information and gesture information with high sensitive and high accuracy, such that the demand of continuous and steady operation in a complex environment of a mobile vehicle is satisfied.

In an embodiment, step 11 includes step 111 to step 113.

In step 111, velocity information of the mobile vehicle is calculated by using the inertial navigation element.

In step 112, position information of the mobile vehicle is calculated by using the inertial navigation element.

In step 113, the gesture parameter of the mobile vehicle is calculated based on the velocity information and the position information.

In an embodiment, step 111 includes:

acquiring angular velocity information of the mobile vehicle by using a gyroscope in the inertial navigation element;

acquiring linear velocity information of the mobile vehicle by using an accelerometer; and calculating a velocity of the mobile vehicle according to equation 1, $$v_k^n = v_{k-1}^n + \Delta v_{f,k}^n + \Delta v_{g/cor,k}^n, \quad \text{equation 1}$$
$$= v_{k-1}^n + [I - 0.5(\xi_k X)]C_{b(k-1)}^{n(k-1)}(\Delta v_{f,k}^b + \Delta v_{scul} + \Delta v_{cot}) + \Delta v_{g/cor,k}^n$$

where $v_k^n$ represents the velocity of the mobile vehicle in a navigation coordinate system at a time instant k, I represents an identity matrix, $\xi_k$ represents an amount of change in angle of the navigation coordinate system with respect to an inertial frame of reference from a time instant k−1 to the time instant k, X represents a cross product operation, $C_{b(k-1)}^{n(k-1)}$ represents a gesture rotation matrix at the time instant k−1, $\Delta v_{f,k}^b$ represents an increment of the velocity of the mobile vehicle in a mobile vehicle coordinate system from the time instant k−1 to the time instant k, $\Delta v_{scul}$ represents a sculling effect velocity compensation, $\Delta v_{cot}$ represents a rotating effect velocity compensation, and $\Delta v_{g/cor,k}^n$ represents a velocity increment caused by gravity and Coriolis force.

Step 112 includes:

calculating, according to equation 2, a position of the mobile vehicle by using the inertial navigation element, $$q_{n(k)}^{e(k)} = q_{e(k-1)}^{e(k)} \times q_{n(k-1)}^{e(k-1)} \times q_{n(k)}^{n(k-1)}, \quad \text{equation 2}$$

$$\text{where } q_{n(k)}^{n(k-1)} = \begin{bmatrix} \cos\|0.5\zeta_k\| \\ \dfrac{\sin\|0.5\zeta_k\|}{\|0.5\zeta_k\|} * 0.5\zeta_k \end{bmatrix},$$

$$q_{e(k-1)}^{e(k)} = \begin{bmatrix} \cos\|0.5\zeta_k\| \\ -\dfrac{\sin\|0.5\zeta_k\|}{\|0.5\zeta_k\|} * 0.5\zeta_k \end{bmatrix}, \zeta_k$$

represents an equivalent rotation vector in a navigation coordinate system from a time instant k−1 to a time instant k, $\xi_k$ represents an equivalent rotation vector caused by earth rotation from the time instant k−1 to the time instant k, $q_{n(k)}^{e(k)}$ represents a position quaternion at the time instant k; and acquiring a latitude L of a current position and a longitude λ of the current position according to a relationship between the quaternion and the position $$q_n^e = \begin{bmatrix} \cos\left(-\dfrac{\pi}{4} - \dfrac{L}{2}\right) * \cos\left(\dfrac{\lambda}{2}\right) \\ -\sin\left(-\dfrac{\pi}{4} - \dfrac{L}{2}\right) * \sin\left(\dfrac{\lambda}{2}\right) \\ \sin\left(-\dfrac{\pi}{4} - \dfrac{L}{2}\right) * \cos\left(\dfrac{\lambda}{2}\right) \\ \cos\left(-\dfrac{\pi}{4} - \dfrac{L}{2}\right) * \sin\left(\dfrac{\lambda}{2}\right) \end{bmatrix}$$

$$L = -2\tan\dfrac{q_n^e(3)}{q_n^e(1)} - \dfrac{\pi}{2}$$

$$\lambda = 2\tan\dfrac{q_n^e(4)}{q_n^e(1)}$$

where $q_n^e(k)$, (k=1,2,3,4) represents the k-th element in vector $q_n^e$.

Based on step 111 and step 112, step 113 particularly includes:

constructing a quaternion for calculating the gesture parameter according to equation 3, $$q_{b(k)}^{n(k)} = q_{n(k-1)}^{n(k)} \times q_{b(k-1)}^{n(k-1)} \times q_{b(k)}^{b(k-1)}, \quad \text{equation 3}$$

$$\text{where } q_{n(k-1)}^{n(k)} = \begin{bmatrix} \cos\|0.5\zeta_k\| \\ -\dfrac{\sin\|0.5\zeta_k\|}{\|0.5\zeta_k\|} * 0.5\zeta_k \end{bmatrix},$$

$$q_{b(k)}^{b(k-1)} = \begin{bmatrix} \cos\|0.5\phi_k\| \\ \dfrac{\sin\|0.5\phi_k\|}{\|0.5\phi_k\|} * 0.5\phi_k \end{bmatrix}, \zeta_k$$

represents an equivalent rotation vector in a navigation coordinate system from a time instant k−1 to a time instant k, $\phi_k$ represents an equivalent rotation vector in a mobile vehicle coordinate system, and $q_{b(k)}^{n(k)}$ represents a gesture quaternion at the time instant k, $q_A^B$ represents a quaternion of a coordinate system B relative to a coordinate system A, n represents the navigation coordinate system and b represents the mobile vehicle coordinate system; and transforming updated gesture quaternion to obtain a gesture matrix $C_b^n$ according to equation 4, where the transforming steps here are mature algorithms without a fixed name and the algorithms are related with a rotation matrix of a space coordinate system, $$C_b^n = \quad \text{equation 4}$$

$$\begin{bmatrix} q_1^2 + q_2^2 + q_3^2 + q_4^2 & 2(q_2q_3 - q_1q_4) & 2(q_2q_4 + q_1q_3) \\ 2(q_2q_3 + q_1q_4) & q_1^2 - q_2^2 + q_3^2 - q_4^2 & 2(q_3q_4 - q_1q_2) \\ 2(q_2q_4 - q_1q_3) & 2(q_3q_4 - q_1q_2) & q_1^2 - q_2^2 - q_3^2 + q_4^2 \end{bmatrix}$$

where $C_b^n$ represents the gesture matrix in a direction cosine form and $q_x$ represents an x-th dimension of the gesture quaternion $q_b^n$; and obtaining a misalignment angle according to a relationship between the gesture matrix and a direction angle, $$C_b^n = \begin{bmatrix} \cos(p)\cos(h) & -\cos(r)\sin(h) + \sin(r)\sin(p)\cos(h) & \sin(r)\sin(h) + \cos(r)\sin(p)\cos(h) \\ \cos(p)\sin(h) & \cos(r)\cos(h) + \sin(r)\sin(p)\sin(h) & -\sin(r)\cos(h) + \cos(r)\sin(p)\sin(h) \\ -\sin(p) & \sin(r)\cos(p) & \cos(r)\cos(p) \end{bmatrix}$$

$$r = a\tan 2(C_b^n(3,2), C_b^n(3,3))$$

$$p = a\tan\left(-C_b^n(3,1)/\sqrt{(C_b^n(3,2)^2 + C_b^n(3,3)^2)}\right)$$

$$h = a\tan 2(C_b^n(2,1), C_b^n(1,1))$$

where r represents a flip angle, p represents a pitch angle, h represents a heading angle, and $C_b^n(x, y)$ represents an (x/y)-th dimension of the gesture matrix $C_b^n$, where an initial gesture matrix is initialized according to the above misalignment angle transformation matrix.

Optionally, step 12 includes step 121 and step 122.

In step 121, a position error, a velocity error, a misalignment angle of the mobile vehicle, a bias error of a gyroscope and a bias error of an accelerator are selected as state variables in a filtering estimation process, and a state covariance matrix from a time instant n−1 to a time instant n are predicted.

In step 122, the state variable and the state covariance matrix are estimated in a real time manner by using a Kalman filtering method, and in the process of real time estimation, feedback correction is performed on the motion parameter of the mobile vehicle based on the error estimation value of the motion state.

Figure 2:
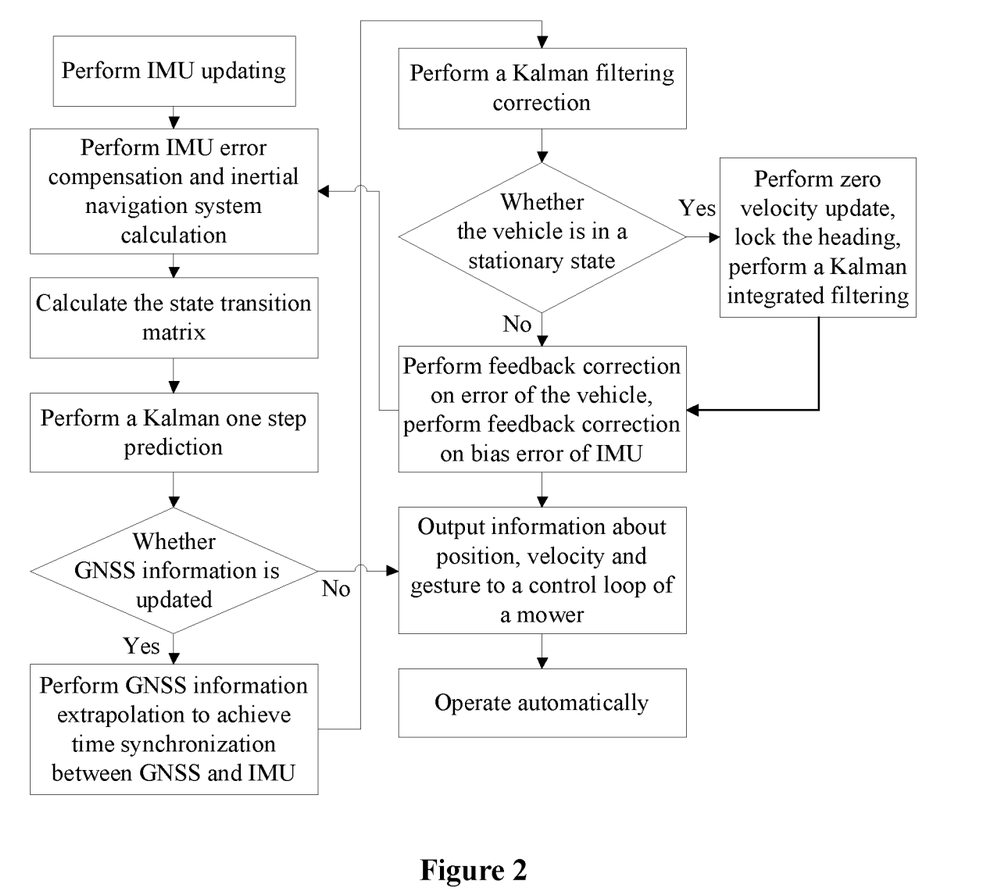
FIG. 2 is a detailed schematic flowchart of step 12 according to the present disclosure.

In an embodiment, a difference between a position calculated by using the inertial navigation system and a position obtained by differential for GNSS and a difference between a velocity calculated by using the inertial navigation system and a velocity obtained by differential for GNSS are considered as observation variables. A state error is estimated in a real time manner by using the Kalman filtering method, and a feedback correction is performed on the position of the vehicle, the velocity of the vehicle and inertial instrument error by using an estimation value of the state error. The corrected navigation information is transmitted to a computer on the vehicle to perform a loop control for an automatic operation of an intelligent mower and deliver instructions. The process of the technologies is as shown in FIG. 2.

IMU error compensation and inertial navigation system calculation are described as follows. Feedback correction is performed on a real-time output of IMU based on a bias error of IMU obtained by Kalman filtering estimation or based on initially given bias error of IMU. For the description of the inertial navigation system calculation, the above description of the inertial navigation system calculation may be referred.

A state transition matrix is calculated as follows. A position error, a velocity error, a misalignment angle of the mobile vehicle, a bias error of a gyroscope and a bias error of an accelerator are selected as 15 dimension state variables in a filtering estimation process, that is $$X = [\delta L \, \delta\lambda \, \delta h \, \delta V_N \, \delta V_E \, \delta V_D \, \phi_N \, \phi_E \, \phi_D \, \varepsilon_{bf} \, \varepsilon_{br} \, \varepsilon_{bd} \, \nabla_{bf} \, \nabla_{br} \, \nabla_{bd}]^T.$$

It should be note that, $\varepsilon_{bf}$, $\varepsilon_{br}$, $\varepsilon_{bd}$, $\nabla_{bf}$, $\nabla_{br}$ and $\nabla_{bd}$ respectively represents an error of the gyroscope corresponds to the front axis of the vehicle coordinate system, an error of the gyroscope corresponds to the right axis of the vehicle coordinate system, an error of the gyroscope corresponds to the below axis of the vehicle coordinate system, an error of the accelerator corresponds to the front axis of the vehicle coordinate system, an error of the accelerator corresponds to the right axis of the vehicle coordinate system and an error of the accelerator corresponds to the below axis of the vehicle coordinate system, rather than bias errors of IMU corresponds to XYZ axes.

The state transition matrix as follows may be obtained based on relationships between selected state variables $$\phi = \begin{bmatrix} F_1 & F_2 & 0 & 0 & 0 \\ F_3 & F_4 & F_5 & 0 & F_6 \\ 0 & 0 & F_7 & F_8 & 0 \\ 0 & 0 & 0 & F_9 & 0 \\ 0 & 0 & 0 & 0 & F_{10} \end{bmatrix}$$

where $F_1$ represents a state transition matrix from a position to another position, $F_2$ represents a state transition matrix from a position to a velocity, $F_3$ represents a state transition matrix from a velocity to a position, $F_4$ represents a state transition matrix from a velocity to another velocity, $F_5$ represents a state transition matrix from a velocity to a gesture, $F_6$ represents a state transition matrix from a velocity to a bias error of the accelerator, $F_7$ represents a state transition matrix from a gesture to another gesture, $F_8$ represents a state transition matrix from a gesture to a bias error of the gyroscope, $F_9$ represents a state transition matrix from a bias error of the gyroscope to another bias error of the gyroscope, and $F_{10}$ represents a state transition matrix from a bias error of the accelerator to another bias error of the accelerator. The above state transition matrixes can be derived based on relationships between states.

The predicting a state covariance matrix from a time instant n−1 to a time instant n in step 121 includes:

constructing a state variable expression $\hat{X}_{n|n-1}=\phi_{n|n-1}\hat{X}_{n-1}$ and constructing a state variable expression $P_{n|n-1}=\phi_{n|n-1}P_{n-1}\phi_{n|n-1}^T+(\phi_{n|n-1}Q+Q\phi_{n|n-1}^T)\delta t/2$, where $\hat{X}_{n-1}$ represents an estimation value of a state variable X at the time instant n−1, $P_{n-1}$ represents a state covariance matrix at the time instant n−1, $\phi_{n|n-1}$ represents a state transition matrix from the time instant −1 to the time instant n, Q represents a system noise matrix, and $\delta t$ represents an updating period of an inertial measurement unit.

Step 122 includes:

performing real-time estimation by using the Kalman filtering method, where a filter gain expression is shown as equation 5, $$K_n = P_{n|n-1}H_n^T(H_nP_{n|n-1}H_n^T+R_n)^{-1} \qquad \text{equation 5}$$

where $K_n$, represents a filter gain at the time instant n, $H_n$ represents an observation matrix at the time instant n which is obtained from a relationship between an observation variable and the state variable, $R_n$ represents an observation noise covariance matrix at the time instant n;

performing real-time estimation according to equation 6 and equation 7, $$\hat{X}_n = \hat{X}_{n|n-1}+K_n(Z_n-H_n\hat{X}_{n|n-1}) \qquad \text{equation 6}$$

where $\hat{X}_n$ represents an estimation value of the state variable at the time instant n, $Z_n$ represents the observation variable at the time instant n, which is a difference in position and velocity between an inertial measurement unit and GNSS, $$P_n = (I-K_nH_n)P_{n|n-1}(I-K_nH_n)^T+K_nR_nK_n^T \qquad \text{equation 6}$$

where $P_n$ represents the state covariance matrix at the time instant n, I represents an identity matrix;

after performing estimation by filtering, correcting a current position, a current velocity and a current gesture by using the estimated state variable and performing feedback correction on the estimated bias of the gyroscope and the estimated bias of the accelerator for the outputting information of IMU in the next period.

A zero velocity update technology and a heading locking technology are described as follows. For the GNSS/INS integrated navigation, in a case that the vehicle is in a stationary state, high position accuracy can be maintained. However, heading of IMU cannot be observed. Besides, heading of the vehicle drifts gradually. Therefore, demands of an intelligent mower or other fields with a high requirement for heading cannot be satisfied.

In a case that the vehicle is in a stationary state, three-dimensional velocity of the vehicle is constrained by zero. Simultaneously heading of the vehicle is constrained. That is, an integrated filtering is further performed on the three-dimensional velocity and one-dimensional heading.

Basic principle of the integrated filtering is the same as principles described above. However, velocity of GNSS is set for zero. Besides, a value of drift heading of the gyroscope is defined to be a small value or zero, thereby suppressing a drift of position and heading over time very well.

Optionally, the integrated navigation method further includes: performing a time synchronization operation on data obtained by the inertial navigation element and data obtained by the satellite navigation element.

In implementation, the updating rate of GNSS information is slower than the updating rate of IMU information. IMU does not necessarily update information synchronously when GNSS information is updated, therefore, a strict time synchronization is required for IMU and GNSS to update information.

The period of PPS signal of GNSS is 1 second with an error around 20 nanoseconds. A system crystal oscillator starts timing when the PPS signal arrives. When IMU information is updated, the updated time of IMU is equal to the time of PPS plus the system timing. System crystal oscillator of each PPS restarts timing, which is equivalent to calibrating a crystal oscillator every one second, such that even a crystal oscillator with a poor accuracy can satisfy a demand of high accuracy for the time synchronization.

When GNSS information is updated, GNSS information is extrapolated to a time instant when current IMU information is latterly updated. A uniform extrapolation method or a uniformly accelerative extrapolation method may be chose based on dynamic size.

The uniform extrapolation means that when it is informed that GNSS information is hysteretic, under the precondition of maintaining running velocity of the mobile vehicle, GNSS information after a certain period of time is acquired as information synchronous with IMU information based on a calibrated time difference. The uniformly accelerative extrapolation means that when it is informed that GNSS information is hysteretic, the running velocity of the mobile vehicle is set as uniformly accelerated based on the calibrated time difference and GNSS information after a certain period of time is acquired as information synchronous with IMU information under the precondition of uniform acceleration, thereby ensuring the synchronization of data between GNSS information and IMU information.

A time synchronization of IMU, GNSS and an odometer is implemented by adopting a soft correction method. In a real-time processing system, there is a problem of asynchronous time between IMU and auxiliary information. 1PPS (pulse per second) signal period with high accuracy is used to calibrate the timing system of the processor, and a crystal oscillator with low accuracy may be used to obtain synchronous time with high accuracy.

An integrated navigation method for a mobile vehicle is according to the disclosure. The method includes: acquiring a motion measurement of the mobile vehicle by using an inertial navigation element in the mobile vehicle and calculating a gesture parameter of the mobile vehicle based on the motion measurement; estimating, based on the gesture parameter, a motion state of the mobile vehicle in a real time manner by using a satellite navigation element in the mobile vehicle to obtain an error estimation value of the motion state, and correcting a motion parameter of the mobile vehicle based on the error estimation value of the motion state; and controlling an operation route of the mobile vehicle based on corrected navigation information. By using the GNSS/INS integrated navigation method provided in the present disclosure, a dynamic initial alignment with fast convergence speed and the high accuracy is achieved. In addition, the method can significantly aid the heading information and provide a misalignment angle with high accuracy. If GNSS information is lost, the provided method can restrain the divergence of IMU and can provide position information, velocity information and gesture information with high accuracy.

Embodiment 2

Figure 3:
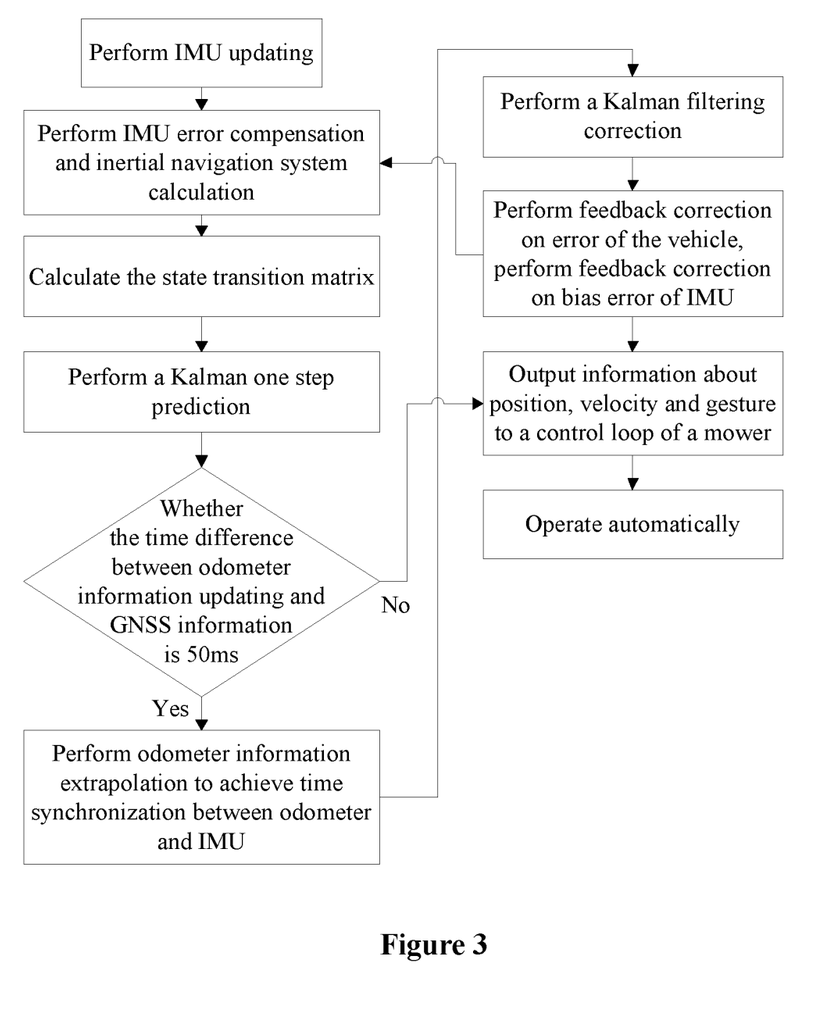
FIG. 3 is schematic flowchart of an INS/vehicle integrated navigation method according to the present disclosure.

The implementation manners of the integrated navigation method according to the disclosure includes the above implementation manner, in which GNSS, INS and vehicle kinematics model are used, and another implementation manner in which INS/vehicle navigation is used, as shown in FIG. 3. Kinematic model of the mobile vehicle can be simplified as a vehicle model with two wheels. A front/right/below coordinate system is built with taking the center position of the rear axle of the vehicle model as the origin. Ideally, in the center position of the rear axle of the vehicle model, velocity in the right axis direction and velocity in the below axis direction are both zero, and velocity in the front axis direction can be obtained by transforming real time rotation speed of the wheel motor, thereby obtaining a vehicle velocity vector in the front/right/below coordinate system.

Selecting velocity errors in the three axis of the vehicle as observation variables to perform an INS/vehicle integrated navigation can aid heading of an inertial measurement unit and constrains velocity and position in the three axis of the vehicle. Particularly, if GNSS information is lost, the method can restrain the rapid divergence of the inertial measurement unit, and high navigation accuracy is provided in a short time, thereby efficiently solving the problem of low accuracy in a case that the vehicle is in a complex environment such as a signal is occluded for a short time.

Basic principle of NHC constraint is similar to principle of above integrated navigation. The difference between principle of the NHC constraint and principle of the integrated navigation is that in NHC constraint, observation variables for state are the velocity errors in the three axis of the vehicle in the front/right/below coordinate system. And only 3 dimension velocity of the vehicle can be constrained.

The content of the inertial measurement unit (IMU) error compensation, the inertial navigation system calculation, the calculation of the state transition matrix, the one step prediction, the feedback correction and the time synchronization in embodiment 2 is respectively consistent with the content of the IMU error compensation, the inertial navigation system calculation, the calculation of the state transition matrix, the prediction of the state variable $\hat{X}_{n|n-1}$ and the state covariance matrix $P_{n|n-1}$ from time instant n−1 to time instant n, the feedback correction and the time synchronization in embodiment 1. However, in embodiment 2, the observation variable Zn only has a 3 dimension velocity difference, and does not have a 3 dimension position differ-ence. In addition, the determination criteria of the time synchronization is simplified as a time difference of 50 millisecond.

The sequence numbers in the embodiments above are only for description, but do not represents any sequence in assembly of components or in the use of components.

The above content merely describes embodiments of the present disclosure, and the above content is not used to limit the present disclosure. Any modifications, equivalent replacements, improvements made according to the spirit and principle of the present disclosure should be regarded as within the protection scope of the present disclosure.

The invention claimed is:

1. An integrated navigation method for a mobile vehicle, comprising:
acquiring a motion measurement of the mobile vehicle by using an inertial navigation element in the mobile vehicle and calculating a gesture parameter of the mobile vehicle based on the motion measurement;
estimating, based on the gesture parameter, a motion state of the mobile vehicle in a real time manner by using a satellite navigation element in the mobile vehicle to obtain an error estimation value of the motion state, and correcting a motion parameter of the mobile vehicle based on the error estimation value of the motion state; and
controlling an operation route of the mobile vehicle based on corrected navigation information,
when GNSS (global navigation satellite system) information is updated, GNSS information is extrapolated to a time instant when current IMU (inertial measurement unit) information is latterly updated, and a uniform extrapolation method or a uniformly accelerative extrapolation method is chosen based on a calibrated time difference.

2. The integrated navigation method for a mobile vehicle according to claim 1, wherein the acquiring a motion measurement of the mobile vehicle by using an inertial navigation element in the mobile vehicle and calculating a gesture parameter of the mobile vehicle based on the motion measurement comprises:
calculating velocity information of the mobile vehicle by using the inertial navigation element;
calculating position information of the mobile vehicle by using the inertial navigation element; and
calculating the gesture parameter of the mobile vehicle based on the velocity information and the position information.

3. The integrated navigation method for a mobile vehicle according to claim 2, wherein the calculating velocity information of the mobile vehicle by using the inertial navigation element comprises:
acquiring angular velocity information of the mobile vehicle by using a gyroscope in the inertial navigation element;
acquiring linear velocity information of the mobile vehicle by using an accelerometer; and
calculating a velocity of the mobile vehicle according to equation 1, $$v_k^n = v_{k-1}^n + \Delta v_{f,k}^n + \Delta v_{g/cor,k}^n \qquad \text{equation 1}$$
$$= v_{k-1}^n + [I - 0.5(\xi_k X)]C_{b(k-1)}^{n(k-1)}(\Delta v_{f,k}^b + \Delta v_{scul} + \Delta v_{cot}) + \Delta v_{g/cor,k}^n$$

wherein $v_k^n$ represents the velocity of the mobile vehicle in a navigation coordinate system at a time instant k, I represents an identity matrix, $\xi_k$ represents an amount of change in angle of the navigation coordinate system with respect to an inertial frame of reference from a time instant k−1 to the time instant k, X represents a cross product operation, $C_{b(k-1)}^{n(k-1)}$ represents a gesture rotation matrix at the time instant k−1, $\Delta v_{f,k}^b$ represents an increment of the velocity of the mobile vehicle in a mobile vehicle coordinate system from the time instant k−1 to the time instant k, $\Delta v_{scul}$ represents a sculling effect velocity compensation, $\Delta v_{cot}$ represents a rotating effect velocity compensation, and $\Delta v_{g/cor,k}^n$ represents a velocity increment caused by gravity and Coriolis force.

4. The integrated navigation method for a mobile vehicle according to claim 2, wherein the calculating position information of the mobile vehicle by using the inertial navigation element comprises:

calculating, according to equation 2, a position of the mobile vehicle by using the inertial navigation element, $$q_{n(k)}^{e(k)} = q_{e(k-1)}^{e(k)} \times q_{n(k-1)}^{e(k-1)} \times q_{n(k)}^{n(k-1)} \quad \text{equation 2}$$

$$\text{where } q_{n(k)}^{n(k-1)} = \begin{bmatrix} \cos \|0.5\zeta_k\| \\ \dfrac{\sin \|0.5\zeta_k\|}{\|0.5\zeta_k\|} * 0.5\zeta_k \end{bmatrix},$$

$$q_{e(k-1)}^{e(k)} = \begin{bmatrix} \cos \|0.5\zeta_k\| \\ -\dfrac{\sin \|0.5\zeta_k\|}{\|0.5\zeta_k\|} * 0.5\zeta_k \end{bmatrix}, \zeta_k$$

$\zeta_k$ represents an equivalent rotation vector in a navigation coordinate system from a time instant k−1 to a time instant k, $\xi_k$ represents an equivalent rotation vector caused by earth rotation from the time instant k−1 to the time instant k, $q_{n(k)}^{e(k)}$ represents a position quaternion at the time instant k; and transforming updated quaternion to obtain updated position, wherein a relationship between the quaternion and the position is $$q_n^e = \begin{bmatrix} \cos\left(-\dfrac{\pi}{4} - \dfrac{L}{2}\right) * \cos\left(\dfrac{\lambda}{2}\right) \\ -\sin\left(-\dfrac{\pi}{4} - \dfrac{L}{2}\right) * \sin\left(\dfrac{\lambda}{2}\right) \\ \sin\left(-\dfrac{\pi}{4} - \dfrac{L}{2}\right) * \cos\left(\dfrac{\lambda}{2}\right) \\ \cos\left(-\dfrac{\pi}{4} - \dfrac{L}{2}\right) * \sin\left(\dfrac{\lambda}{2}\right) \end{bmatrix}$$

wherein L represents a latitude of a current position, and λ represents a longitude of the current position.

5. The integrated navigation method for a mobile vehicle according to claim 2, wherein the calculating the gesture parameter of the mobile vehicle based on the velocity information and the position information comprises:

constructing a quaternion for calculating the gesture parameter according to equation 3, $$q_{b(k)}^{n(k)} = q_{n(k-1)}^{n(k)} \times q_{b(k-1)}^{n(k-1)} \times q_{b(k)}^{b(k-1)}, \quad \text{equation 3}$$

$$\text{where } q_{n(k-1)}^{n(k)} = \begin{bmatrix} \cos \|0.5\zeta_k\| \\ -\dfrac{\sin \|0.5\zeta_k\|}{\|0.5\zeta_k\|} * 0.5\zeta_k \end{bmatrix},$$

$$q_{b(k)}^{b(k-1)} = \begin{bmatrix} \cos \|0.5\phi_k\| \\ \dfrac{\sin \|0.5\phi_k\|}{\|0.5\phi_k\|} * 0.5\phi_k \end{bmatrix}, \zeta_k$$

$\zeta_k$ represents an equivalent rotation vector in a navigation coordinate system from a time instant k−1 to a time instant k, $\phi_k$ represents an equivalent rotation vector in a mobile vehicle coordinate system, and $q_{b(k)}^{n(k)}$ represents a gesture quaternion at the time instant k; and transforming updated gesture quaternion to obtain a gesture matrix $C_b^n$ according to equation 4, $$C_b^n = \quad \text{equation 4}$$

$$\begin{bmatrix} q_1^2 + q_2^2 + q_3^2 + q_4^2 & 2(q_2 q_3 - q_1 q_4) & 2(q_2 q_4 + q_1 q_3) \\ 2(q_2 q_3 + q_1 q_4) & q_1^2 - q_2^2 + q_3^2 - q_4^2 & 2(q_3 q_4 - q_1 q_2) \\ 2(q_2 q_4 - q_1 q_3) & 2(q_3 q_4 - q_1 q_2) & q_1^2 - q_2^2 - q_3^2 + q_4^2 \end{bmatrix}$$

wherein $C_b^n$ represents the gesture matrix in a direction cosine form and $q_x$ represents an x-th dimension of the gesture quaternion $q_b^n$; and obtaining a misalignment angle according to a relationship between the gesture matrix and a direction angle, $$C_b^n = \begin{bmatrix} \cos(p)\cos(h) & -\cos(r)\sin(h) + \sin(r)\sin(p)\cos(h) & \sin(r)\sin(h) + \cos(r)\sin(p)\cos(h) \\ \cos(p)\sin(h) & \cos(r)\cos(h) + \sin(r)\sin(p)\sin(h) & -\sin(r)\cos(h) + \cos(r)\sin(p)\sin(h) \\ -\sin(p) & \sin(r)\cos(p) & \cos(r)\cos(p) \end{bmatrix}$$

$$r = a\tan 2(C_b^n(3,2), C_b^n(3,3))$$

$$p = a\tan\left(-C_b^n(3,1)/\sqrt{(C_b^n(3,2)^2 + C_b^n(3,3)^2)}\right)$$

$$h = a\tan 2(C_b^n(2,1), C_b^n(1,1))$$

wherein r represents a flip angle, p represents a pitch angle, h represents a heading angle, and $C_b^n(x, y)$ represents an (x/y)-th dimension of the gesture matrix $C_b^n$, wherein an initial gesture matrix is initialized according to the above misalignment angle transformation matrix.

6. The integrated navigation method for a mobile vehicle according to claim 1, wherein the estimating, based on the gesture parameter, a motion state of the mobile vehicle in a real time manner by using a satellite navigation element in the mobile vehicle to obtain an error estimation value of the motion state, and correcting a motion parameter of the mobile vehicle based on the error estimation value of the motion state comprises:

selecting a position error, a velocity error, a misalignment angle of the mobile vehicle, a bias error of a gyroscope and a bias error of an accelerator as state variables in a filtering estimation process and predicting a state covariance matrix from a time instant n−1 to a time instant n; and estimating the state variable and the state covariance matrix in a real time manner by using a Kalman filtering method, and performing, in the process of real time estimation, feedback correction on the motion parameter of the mobile vehicle based on the error estimation value of the motion state.

7. The integrated navigation method for a mobile vehicle according to claim 6, wherein the predicting a state covariance matrix from a time instant n−1 to a time instant n comprises:

constructing a state variable expression $\hat{X}_{n|n-1} = \phi_{n|n-1} \hat{X}_{n-1}$ and constructing a state covariance matrix $P_{n|n-1} = \phi_{n|n-1} P_{n-1} \phi_{n|n-1}^T + (\phi_{n|n-1} Q + Q \phi_{n|n-1}^T) \delta t/2$, wherein $X_{n-1}$ represents an estimation value of a state variable X at the time instant n−1, $P_{n-1}$ represents a state covariance matrix at the time instant n−1, $\phi_{n|n-1}$ represents a state transition matrix from the time instant n−1 to the time instant n, Q represents a system noise matrix, and $\delta t$ represents an updating period of an inertial measurement unit.

8. The integrated navigation method for a mobile vehicle according to claim 6, wherein the estimating the state variable and the state covariance matrix in a real time manner by using a Kalman filtering method, and performing, in the process of real time estimation, feedback correction on the motion parameter of the mobile vehicle based on the error estimation value of the motion state comprises:

performing real-time estimation by using the Kalman filtering method, wherein a filter gain expression is shown as equation 5, $$K_n = P_{n|n-1} H_n^T (H_n P_{n|n-1} H_n^T + R_n)^{-1} \qquad \text{equation 5}$$

wherein $K_n$ represents a filter gain at the time instant n, $H_n$ represents an observation matrix at the time instant n which is obtained from a relationship between an observation variable and the state variable, $R_n$ represents an observation noise covariance matrix at the time instant n;

performing real-time estimation according to equation 6 and equation 7, $$\hat{X}_n = \hat{X}_{n|n-1} + K_n(Z_n - H_n \hat{X}_{n|n-1}) \qquad \text{equation 6}$$

wherein $\hat{X}_n$ represents an estimation value of the state variable at the time instant n, $Z_n$ represents the observation variable at the time instant n, which is a difference in position and velocity between an inertial measurement unit and GNSS, $$P_n = (I - K_n H_n) P_{n|n-1} (I - K_n H_n)^T + K_n R_n K_n^T \qquad \text{equation 7}$$

wherein $P_n$ represents the state covariance matrix at the time instant n, I represents an identity matrix;

after performing estimation by filtering, correcting a current position, a current velocity and a current gesture by using the estimated state variable and performing feedback correction on the estimated bias of the gyroscope and the estimated bias of the accelerator for the outputting information in the next period.

9. The integrated navigation method for a mobile vehicle according to claim 1, further comprising:

performing a time synchronization operation on data obtained by the inertial navigation element and data obtained by the satellite navigation element.

* * * * *